US010772035B2

(12) United States Patent
Li et al.

(10) Patent No.: US 10,772,035 B2
(45) Date of Patent: Sep. 8, 2020

(54) METHOD AND APPARATUS FOR GENERATING INFORMATION

(71) Applicant: Baidu Online Network Technology (Beijing) Co., Ltd., Beijing (CN)

(72) Inventors: Yanyan Li, Beijing (CN); Jianguo Duan, Beijing (CN); Hui Xiong, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/563,672

(22) Filed: Sep. 6, 2019

(65) Prior Publication Data

US 2019/0394717 A1   Dec. 26, 2019

(30) Foreign Application Priority Data

Oct. 24, 2018 (CN) .......................... 2018 1 1240888

(51) Int. Cl.
*H04W 48/16* (2009.01)
*G06K 9/62* (2006.01)
*H04W 8/00* (2009.01)
*H04W 48/18* (2009.01)
*H04W 84/12* (2009.01)

(52) U.S. Cl.
CPC .......... *H04W 48/16* (2013.01); *G06K 9/6276* (2013.01); *H04W 8/005* (2013.01); *H04W 48/18* (2013.01); *H04W 84/12* (2013.01)

(58) Field of Classification Search
USPC ....................................................... 455/434
See application file for complete search history.

(56) References Cited

U.S. PATENT DOCUMENTS

| 10,383,037 | B1* | 8/2019 | Patwardhan | .......... H04W 48/16 |
| 2006/0095348 | A1* | 5/2006 | Jones | .......... G01S 5/02 705/29 |
| 2009/0022076 | A1* | 1/2009 | Canpolat | .......... H04L 63/162 370/310 |

(Continued)

FOREIGN PATENT DOCUMENTS

| CN | 107347204 A | 11/2017 | |
| EP | 2509367 A1 * | 10/2012 | ............ H04W 48/16 |

*Primary Examiner* — Nathan S Taylor
(74) *Attorney, Agent, or Firm* — Kilpatrick Townsend & Stockton LLP

(57) ABSTRACT

Disclosed are a method and apparatus for generating information. A method may include: receiving wireless local area network scanning information sent by a terminal, the wireless local area network scanning information including a wireless local area network identifier of at least one wireless local area network; determining, from the wireless local area network identifier of the at least one wireless local area network, a wireless local area network identifier as a target wireless local area network identifier; determining feature information of a target wireless local area network corresponding to the target wireless local area network identifier; and generating, based on the feature information of the target wireless local area network and a pre-established category identification model, category information corresponding to the target wireless local area network, the category identification model being used to represent a corresponding relationship between the feature information and the category information.

20 Claims, 5 Drawing Sheets

(56) References Cited

U.S. PATENT DOCUMENTS

| | | | |
|---|---|---|---|
| 2009/0288140 A1* | 11/2009 | Huber | G06Q 20/102 726/2 |
| 2011/0208866 A1* | 8/2011 | Marmolejo-Meillon | H04L 63/0823 709/227 |
| 2013/0166196 A1* | 6/2013 | Narasimha | G01C 21/3682 701/426 |
| 2014/0342752 A1* | 11/2014 | Jones | G01S 5/02 455/456.1 |
| 2015/0131483 A1* | 5/2015 | Colban | H04W 48/16 370/254 |
| 2016/0036829 A1* | 2/2016 | Sadeh-Koniecpol | G06F 21/565 726/23 |
| 2017/0272911 A1* | 9/2017 | Agrawal | H04W 4/027 |
| 2018/0084520 A1* | 3/2018 | Waldorf | H04W 48/16 |
| 2018/0376523 A1* | 12/2018 | Li | H04W 12/06 |
| 2019/0289539 A1* | 9/2019 | Lee | H04W 40/246 |
| 2019/0306781 A1* | 10/2019 | Do | H04W 48/04 |

* cited by examiner

METHOD AND APPARATUS FOR GENERATING INFORMATION

CROSS-REFERENCE TO RELATED APPLICATIONS

This application claims priority to Chinese Patent Application No. 201811240888.0, filed on Oct. 24, 2018, titled "Method and apparatus for generating information," which is hereby incorporated by reference in its entirety.

TECHNICAL FIELD

Embodiments of the present disclosure relate to the field of computer technology, specifically to a method and apparatus for generating information.

BACKGROUND

With the continuous development of the mobile Internet and mobile intelligent terminal devices, Wireless Local Area Networks (WLAN) has become one of the necessary facilities and services for service industries such as hotels, restaurants, or retails. If a terminal device carried by a user scans or connects to the WLAN, it may be considered that the user have accessed the point of interest (POI) where the WLAN is located.

Generally, the acquisition of point of interest information may be performed manually, or data may be crawled from brand official websites, review websites, etc. by web crawlers. For some brand companies (for example, chain hotels, chain restaurants, etc.), new stores are opened every year as the companies expand. If information acquiring is performed manually or by a web crawler, it takes a long period of time from the opening of a new store to the acquiring of information (for example, the brand of the new store, POI information, etc.) of the new store.

SUMMARY

Embodiments of the present disclosure propose a method and apparatus for generating information.

In a first aspect, an embodiment of the present disclosure provides a method for generating information, including: receiving wireless local area network scanning information sent by a terminal, the wireless local area network scanning information including a wireless local area network identifier of at least one wireless local area network; determining, from the wireless local area network identifier of the at least one wireless local area network, a wireless local area network identifier as a target wireless local area network identifier; determining feature information of a target wireless local area network corresponding to the target wireless local area network identifier; and generating, based on the feature information of the target wireless local area network and a pre-established category identification model, category information corresponding to the target wireless local area network, the category identification model being used to represent a corresponding relationship between the feature information and the category information.

In some embodiments, the method further includes: determining location information of the target wireless local area network based on location information of the terminal; and generating point of interest information based on the generated category information and the location information of the target wireless local area network, and transmitting the point of interest information.

In some embodiments, the category identification model includes a category identification sub-model and a category determination sub-model; and the generating, based on the feature information of the target wireless local area network and a pre-established category identification model, category information corresponding to the target wireless local area network, includes: inputting the target wireless local area network identifier into the category identification sub-model to obtain a category identification result, where the category identification sub-model is used to represent a corresponding relationship between the wireless local area network identifier and the category identification result; determining, in response to determining that the obtained category identification result matches a category in a preset category set, the category matching the obtained category identification result as a target category, and determining a category determination model pre-established for the target category as the category determination sub-model, where the category determination sub-model is configured to determine whether the target wireless local area network corresponding to the feature information belongs to the target category; and inputting the feature information of the target wireless local area network into the category determination sub-model to obtain a determination result of whether the target wireless local area network belongs to the target category, where the determination result includes yes or no; and determining, in response to determining that the determination result is yes, the target category as the category information corresponding to the target wireless local area network.

In some embodiments, the category identification sub-model is a K-nearest neighbors algorithm; the inputting the target wireless local area network identifier into the category identification sub-model to obtain a category identification result, includes: acquiring a first training sample set, where a first training sample includes the wireless local area network identifier and a category corresponding to the wireless local area network identifier; and obtaining, based on the first training sample set and the K-nearest neighbors algorithm, the category identification result of the target wireless local area network identifier.

In some embodiments, the category determination sub-model is a two-category model; and the category determination sub-model of the target category is obtained by training by: acquiring a second training sample set, where a second training sample includes the feature information and the determination result of whether the wireless local area network corresponding to the feature information belongs to the target category; and using the feature information of the training sample in the second training sample set as an input, using the determination result of whether the target wireless local area network corresponding to the input feature information belongs to the target category as a desired output, and training to obtain the category determination sub-model.

In some embodiments, the category identification model is a classification model; and the generating, based on the feature information of the target wireless local area network and a pre-established category identification model, category information corresponding to the target wireless local area network, includes: inputting the feature information of the target wireless local area network into the classification model to obtain the category information corresponding to the target wireless local area network, where the classification model is used to represent the corresponding relationship between the feature information and the category information of the wireless local area network.

In some embodiments, the classification model is obtained by training by: acquiring a third training sample set, where a third training sample includes the feature information of the wireless local area network and category information of the wireless local area network corresponding to the feature information; and using the feature information of the training sample in the third training sample set as an input, using the category information corresponding to the input feature information as a desired output, and training to obtain the classification model.

In a second aspect, an embodiment of the present disclosure provides an apparatus for generating information, including: a receiving unit, configured to receive wireless local area network scanning information sent by a terminal, the wireless local area network scanning information including a wireless local area network identifier of at least one wireless local area network; a first determining unit, configured to determine, from the wireless local area network identifier of the at least one wireless local area network, a wireless local area network identifier as a target wireless local area network identifier; a second determining unit, configured to determine feature information of a target wireless local area network corresponding to the target wireless local area network identifier; and a generating unit, configured to generate, based on the feature information of the target wireless local area network and a pre-established category identification model, category information corresponding to the target wireless local area network, the category identification model being used to represent a corresponding relationship between the feature information and the category information.

In some embodiments, the apparatus further includes: a third determining unit, configured to determine location information of the target wireless local area network based on location information of the terminal; and a transmitting unit, configured to generate point of interest information based on the generated category information and the location information of the target wireless local area network, and transmit the point of interest information.

In some embodiments, the category identification model includes a category identification sub-model and a category determination sub-model; and the generating unit includes: a first input unit, configured to input the target wireless local area network identifier into the category identification sub-model to obtain a category identification result, where the category identification sub-model is used to represent a corresponding relationship between the wireless local area network identifier and the category identification result; a matching unit, configured to determine, in response to determining that the obtained category identification result matches a category in a preset category set, the category matching the obtained category identification result as a target category, and determine a category determination model pre-established for the target category as the category determination sub-model, where the category determination sub-model is configured to determine whether the wireless local area network corresponding to the feature information belongs to the target category; and a second input unit, configured to input the feature information of the target wireless local area network into the category determination sub-model to obtain a determination result of whether the target wireless local area network belongs to the target category, where the determination result includes yes or no; and an information determining unit, configured to determine, in response to determining that the determination result is yes, the target category as the category information corresponding to the target wireless local area network.

In some embodiments, the category identification sub-model is a K-nearest neighbors algorithm; and the first input unit is further configured to: acquire a first training sample set, where a first training sample includes the wireless local area network identifier and a category corresponding to the wireless local area network identifier; and obtain, based on the first training sample set and the K-nearest neighbors algorithm, the category identification result of the target wireless local area network identifier.

In some embodiments, the category determination sub-model is a two-category model; and the category determination sub-model of the target category is obtained by training by: acquiring a second training sample set, where a second training sample includes the feature information and the determination result of whether the target wireless local area network corresponding to the feature information belongs to the target category; and using the feature information of the training sample in the second training sample set as an input, using the determination result of whether the wireless local area network corresponding to the input feature information belongs to the target category as a desired output, and training to obtain the category determination sub-model.

In some embodiments, the category identification model is a classification model; and the generating unit is further configured to: input the feature information of the target wireless local area network into the classification model to obtain the category information corresponding to the target wireless local area network, where the classification model is used to represent the corresponding relationship between the feature information and the category information of the wireless local area network.

In some embodiments, the classification model is obtained by training by: acquiring a third training sample set, where a third training sample includes the feature information of the wireless local area network and category information of the wireless local area network corresponding to the feature information; and using the feature information of the training sample in the third training sample set as an input, using the category information corresponding to the input feature information as a desired output, and training to obtain the classification model.

In a third aspect, an embodiment of the present disclosure provides a server, including: one or more processors; and a storage apparatus, storing one or more programs thereon, the one or more programs, when executed by the one or more processors, cause the one or more processors to implement the method according to any one of the implementations in the first aspect.

In a fourth aspect, an embodiment of the present disclosure provides a computer readable medium, storing a computer program thereon, the program, when executed by a processor, implements the method according to any one of the implementations in the first aspect.

The method and apparatus for generating information provided by the embodiments of the present disclosure first receive wireless local area network scanning information sent by a terminal, then determine, from the wireless local area network identifier of the at least one wireless local area network, a wireless local area network identifier as a target wireless local area network identifier, determine feature information of a target wireless local area network corresponding to the target wireless local area network identifier, and finally generate, based on the feature information of the target wireless local area network and a pre-established category identification model, category information corresponding to the target wireless local area network, thereby effectively utilizing the wireless local area network scanning information sent by the terminal, and quickly generating category information corresponding to the target wireless local area network.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
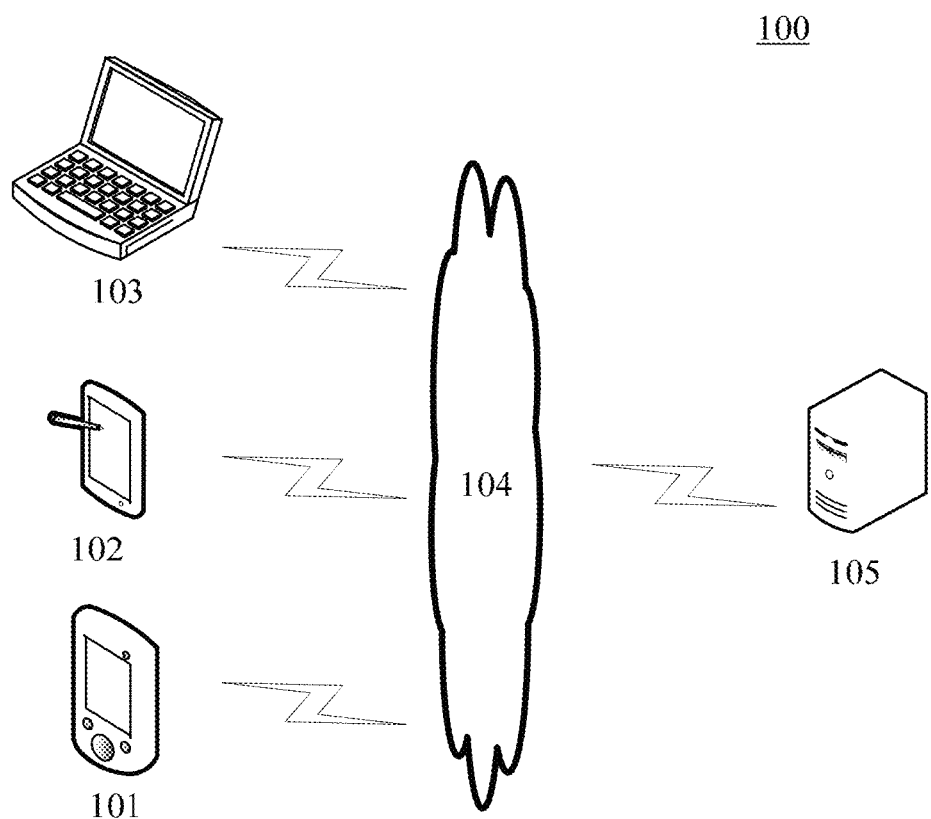
FIG. 1 is an exemplary system architecture diagram to which an embodiment of the present disclosure may be applied.

FIG. 1 illustrates an exemplary system architecture 100 of a method for generating information or an apparatus for generating information to which the embodiments of the present disclosure may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

The user may interact with the server 105 through the network 104 using the terminal devices 101, 102, 103 to receive or send messages and the like. Various communication client applications, such as web browser applications, map applications, search applications, positioning software, or wireless local area network scanning tools, may be installed on the terminal devices 101, 102, and 103.

The terminal devices 101, 102, 103 may be hardware or software. When the terminal devices 101, 102, 103 are hardware, they may be various electronic devices having a wireless local area network scanning function, including, but not limited to, smartphones, tablets, e-book readers, laptop portable computers, and the like. When the terminal devices 101, 102, 103 are software, they may be installed in the above-listed electronic devices. The terminal devices 101, 102, 103 may be implemented as a plurality of pieces of software or a plurality of software modules (for example, software or software modules for providing distributed services) or as a single piece of software or a single software module, which is not specifically limited herein.

The server 105 may be a server that provides various services, such as a background server that analyzes wireless local area network scanning information scanned by the terminal devices 101, 102, 103. The background server may process such as analyze received data such as wireless local area network scanning, and generate category information corresponding to a target wireless local area network.

It should be noted that the server 105 may be hardware or software. When the server 105 is hardware, it may be implemented as a distributed server cluster composed of multiple servers, or may be implemented as a single server. When the server 105 is software, it may be implemented as a plurality of pieces of software or software modules (for example, for providing distributed services), or as a single piece of software or software module, which is not specifically limited herein.

It should be noted that the method for generating information provided by the embodiments of the present disclosure is generally performed by the server 105. Accordingly, the apparatus for generating information is generally disposed in the server 105.

It should be understood that the number of terminal devices, networks, and servers in FIG. 1 is merely illustrative. Depending on the implementation needs, there may be any number of terminal devices, networks, and servers.

Figure 2:
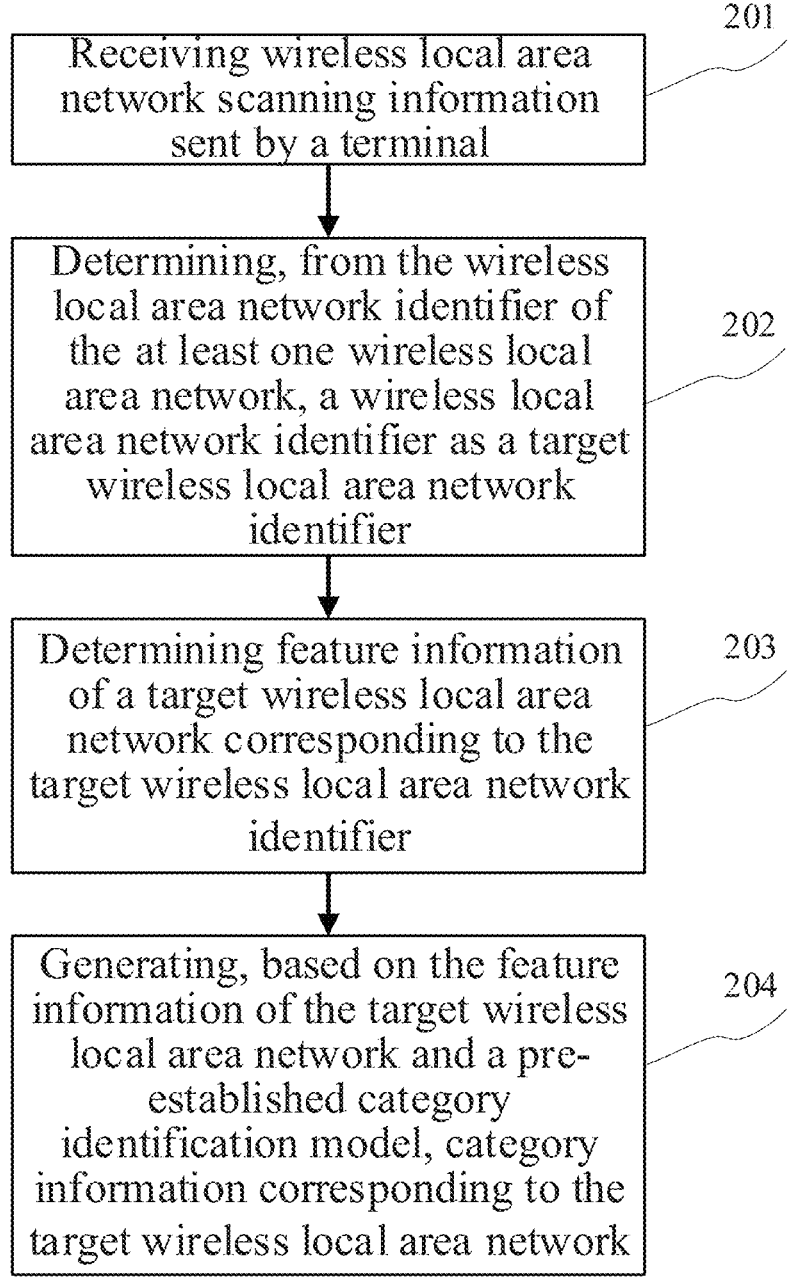
FIG. 2 is a flowchart of a method for generating information according to an embodiment of the present disclosure.

With further reference to FIG. 2, a flow 200 of a method for generating information according to an embodiment of the present disclosure is illustrated. The method for generating information includes the following steps.

Step 201, receiving wireless local area network scanning information sent by a terminal.

In the present embodiment, an executing body of the method for generating information (for example, the server 105 shown in FIG. 1) may receive wireless local area network scanning information from a terminal (such as the terminal devices 101, 102, 103 shown in FIG. 1) carried by a user through a wireless connection. Here, the wireless local area network scanning information may include a wireless local area network identifier and a signal strength of at least one wireless local area network. Here, the wireless local area network identifier may refer to a wireless local area network name. In practice, the wireless local area network name may refer to a service set identifier (SSID). The SSID is a wireless local area network identifier that the user can see when scanning the wireless local area network using the terminal device, and the user may intuitively understand surrounding wireless local area networks to choose to connect or disconnect.

Step 202, determining, from the wireless local area network identifier of the at least one wireless local area network, a wireless local area network identifier as a target wireless local area network identifier.

In the present embodiment, the executing body may determine, from the wireless local area network identifier of the at least one wireless local area network, a wireless local area network identifier as a target wireless local area network identifier by using various methods (for example, random selection). As an example, a list of wireless local area network identifiers may be pre-stored in the executing body. The list of wireless local area network identifiers may be obtained by the executing body in various ways. For example, the list of WLAN identifiers may be obtained by directly receiving external input. As another example, the list of wireless local area network identifiers may be generated using wireless local area network identifiers in historical wireless local area network scanning information received in the past. Thereafter, for the wireless local area network identifier of each wireless local area network identifier of the at least one wireless local area network, the executing body may compare the wireless local area network identifier of the wireless local area network with the plurality of wireless local area network identifiers in the list of wireless local area network identifiers, and if the wireless local area network identifier is different from each of the wireless local area network identifiers in the list of wireless local area network identifiers, the wireless local area network identifier may be determined as the target wireless local area network identifier. That is, the wireless local area network identifier is a new wireless local area network identifier that has not occurred relative to the plurality of wireless local area network identifiers in the list of wireless local area network identifiers.

Step 203, determining feature information of a target wireless local area network corresponding to the target wireless local area network identifier.

In the present embodiment, the executing body may determine feature information of a target wireless local area network corresponding to the target wireless local area network identifier. Here, the feature information of the target wireless local area network may refer to various feature information related to the target wireless local area network.

As an example, the feature information of the target wireless local area network may include feature information directly related to the target wireless local area network, including but not limited to the wireless local area network identifier, the radiation radius of the wireless local area network, the number of connections of the wireless local area network, the connection duration, and the like of the target wireless local area network. In practice, the radiant radius of the wireless local area network may be obtained by counting, by the executing body, the received wireless local area network scanning information sent by the plurality of terminal devices, for example, if the plurality of terminal devices are equipped with GPS (Global Positioning System), based on the wireless local area network scanning information of the terminal devices at each positioning point, it may be known which positioning points may be scanned to the target wireless local area network, and the coordinates of the positioning points that may be scanned to the target wireless local area network may be analyzed, thereby determining the radiation radius of the target wireless local area network. The number of connections of the wireless local area network may be determined by the executing body by counting the number of terminal devices connected to the target wireless local area network in each counting time period. The connection duration may be obtained by performing statistical analysis on the connection duration of the terminal devices connected to the target wireless local area network by the executing body.

As another example, the feature information of the target wireless local area network may further include feature information related to the geographic location of the target wireless local area network, including but not limited to the index code at the location of the target wireless local area network, the number of points of interest of various categories in the surrounding, the convenience of transportation, the amount of arrival, etc. In practice, the executing body may determine the location information of the target wireless local area network in various ways. For example, suppose a target terminal transmits wireless local area network scanning information including the target wireless local area network to the executing body, the wireless local area network scanning information includes wireless local area network identifiers and signal strengths of scanned wireless local area networks. First, the executing body may determine the location information of the target terminal, for example, determining by the GPS installed in the target terminal, and for example, determining using the wireless local area network scanning information and an existing location fingerprint method. Thereafter, the executing body may determine the location information of the target wireless local area network based on the location information of the target terminal and the signal strength of the target wireless local area network. In actual use, the farther a device is from the transmitting device of the wireless local area network, the weaker the wireless local area network signal that can be scanned. Based on this principle, the executing body may determine the location information of the target wireless local area network based on the location information of the target terminal and the signal strength of the target wireless local area network scanned by the target terminal. It is not difficult to understand that the executing body may use the above method to locate the target wireless local area network multiple times, and perform statistical analysis on the multiple positioning results, so as to make an exact location to the target wireless local area network. After determining the location information of the target wireless local area network, the executing body may determine the index code at the location of the target wireless local area network. The index code may refer to a spatial index code (GeoHash) at the location of the target wireless local area network, and the GeoHash converts two-dimensional latitude and longitude into character strings, each of the character strings represents a certain rectangular area. The executing body may also obtain the number of points of interest of various categories, the convenience of transportation, the amount of arrival, etc. within a preset range around the target wireless local area network. Here, the convenience of transportation may be determined based on data such as bus stops, and subway stations within the preset range around the target wireless local area network. The amount of arrival may be determined based on the number of arrivals of the number of people within the preset range around the target wireless local area network.

Step 204, generating, based on the feature information of the target wireless local area network and a pre-established category identification model, category information corresponding to the target wireless local area network.

In the present embodiment, the executing body may generate, based on the feature information of the target wireless local area network and a pre-established category identification model, category information corresponding to the target wireless local area network. The category identification model is used to represent a corresponding relationship between the feature information and the category information. As an example, the category information corresponding to the target wireless local area network may refer to the brand of the target wireless local area network. In practice, for the convenience of customers, the wireless local area network identifier of a brand point of interest is usually related to the brand name, the pinyin of the brand name, or the like of the point of interest. For example, the name of a chain hotel of a certain brand is Jia. For the convenience of customers, the wireless local area network identifier of the wireless local area network set in the brand hotel is usually set to be an identifier such as JIA, jia, jiaHotel, Jia, Jia-5G, etc.

In some alternative implementations of embodiments of the present disclosure, the category identification model may include a category identification sub-model and a category determination sub-model, and the step 204 may be specifically performed as follows.

Step S1, inputting the target wireless local area network identifier into the category identification sub-model to obtain a category identification result.

Here, the category identification result may refer to the category information (for example, brand name) corresponding to the target wireless local area network. The category identification sub-model may be used to represent a corresponding relationship between the wireless local area network identifier and the category identification result. As an example, the category identification sub-model may include a corresponding relationship table pre-defined by those skilled in the art based on statistics on a large number of wireless local area network identifiers and category identification results, and storing the corresponding relationships between the plurality of wireless local area network identifiers and the category identification results. In this way, the category identification sub-model may match the target wireless local area network identifier with the plurality of wireless local area network identifiers in the corresponding relationship table, if one of the wireless local area network identifiers in the corresponding relationship table is the same as or similar to the target wireless local area network identifier, then the category identification result corresponding to the wireless local area network identifier in the corresponding relationship table is determined as the category identification result of the target wireless local area network.

Step S2, determining, in response to determining that the obtained category identification result matches a category in a preset category set, the category matching the obtained category identification result as a target category, and determining a category determination model pre-established for the target category as the category determination sub-model.

Here, the executing body stores a category set in advance, and the category set includes information of a plurality of categories. For each category in the category set, a category determination model may be pre-stored in the executing body, and the category determination model may be configured to determine whether the target wireless local area network corresponding to the input feature information belongs to the category. As an example, the category determination model may include a corresponding relationship table pre-defined by those skilled in the art based on statistics on a large number of feature information and determination results of whether the target wireless local area network corresponding to the feature information belongs to the category, and storing the corresponding relationships between the plurality of pieces of feature information and the determination results. In this way, the category determination model may match the input feature information with the plurality of pieces of feature information in the corresponding relationship table. If a piece of feature information in the corresponding relationship table is the same as or similar to the input feature information, then the determination result corresponding to the piece of feature information in the corresponding relationship table is determined as the determination result of the input feature information.

In response to determining that the category identification result obtained in step S1 is the same as one of the category information in the category set, the executing body may determine the category having the same category identification result in the category set as the target category. The category determination model pre-established for the target category is determined as the category determination sub-model.

Step S3, inputting the feature information of the target wireless local area network into the category determination sub-model to obtain a determination result of whether the target wireless local area network belongs to the target category.

In the present embodiment, the executing body may input the feature information of the target wireless local area network into the category determination sub-model to obtain a determination result of whether the target wireless local area network belongs to the target category. Here, the determination result may include yes or no. Here, "yes" indicates that the target wireless local area network belongs to the target category, and "no" indicates that the target wireless local area network does not belong to the target category. In practice, the executing body may use 1 for "yes" and 0 for "no".

Step S4, determining, in response to determining that the determination result is yes, the target category as the category information corresponding to the target wireless local area network.

Here, in response to determining that the determination result of step S3 is yes, the executing body may determine the target category as the category information corresponding to the target wireless local area network.

In some alternative implementations, the category identification sub-model may be a K-nearest neighbors (KNN) algorithm, and the step S1 may be specifically performed as follows.

First, acquiring a first training sample set. Here, a first training sample may include a wireless local area network identifier and a category corresponding to the wireless local area network identifier.

Then, obtaining, based on the first training sample set and the K-nearest neighbors algorithm, the category identification result of the target wireless local area network identifier. In practice, the use of the KNN algorithm needs to consider the three elements of K value selection, distance measurement method and classification decision rule. For a fixed first training sample set, if the three elements are determined, the prediction method of the KNN algorithm is also determined. As an example, in the present implementation, the K value selection may be selected by those skilled in the art according to actual needs, for example, K=5 is selected. The distance measurement method may select the editing distance. The classification decision rule may use the majority voting method. The KNN algorithm is a very basic machine learning algorithm. It is not necessary to use the training set for training, the training time is 0, and the algorithm has no assumptions about the data in the classification process and has high accuracy. Therefore, the present implementation may reduce the complexity of generating category identification results by using the K-nearest neighbors algorithm, and improve the accuracy of generating category identification results.

In some alternative implementations, the category determination sub-model is a two-category model. The category determination sub-model of the target category may be obtained by training by the following method: first, acquiring a second training sample set. A second training sample includes the feature information of the wireless local area network and a determination result of whether the target wireless local area network corresponding to the feature information belongs to the target category. Then, the feature information of the wireless local area network of the training sample in the second training sample set is used as an input, and the determination result of whether the target wireless local area network corresponding to the input feature information belongs to the target category is used as a desired output to train to obtain the category determination sub-model.

In the present implementation, first, it is necessary to determine model parameters of an initial category determination sub-model. Here, the initial category determination sub-model includes, but is not limited to, a logistic regression model, a decision tree model, or the like. Then, the feature information of the wireless local area network of the training sample in the second training sample set may be input into the initial category determination sub-model to obtain a prediction determination result of whether the target wireless local area network corresponding to the feature information belongs to the target category. Then, the prediction determination result is compared with the desired output, according to the comparison result, it is determined whether the initial determination sub-model reaches a preset compliance condition. As an example, the compliance condition may be that the prediction accuracy of the initial category determination sub-model is greater than a preset accuracy threshold. Finally, in response to determining that the initial category determination sub-model reaches the preset compliance condition, the initial category determination sub-model is used as the category determination sub-model obtained by training. In response to determining that the initial category determination sub-model does not reach the preset compliance condition, the model parameters of the initial category determination sub-model are adjusted, and the above training steps are resumed. As an example, a back propagation algorithm (BP algorithm) and a gradient descent method (for example, a small batch gradient descent algorithm) may be used to adjust the model parameters of the initial category determination sub-model. It should be noted that the back propagation algorithm and the gradient descent method are well-known technologies widely studied and applied at present, and detailed description thereof will be omitted.

In some alternative implementations, the category identification model may be a classification model, and the above step 204 may be performed as follows.

The executing body may input the feature information of the target wireless local area network into the classification model to obtain the category information corresponding to the target wireless local area network. Here, the classification model is used to represent the corresponding relationship between the feature information and the category information of the wireless local area network. As an example, the classification model may include a corresponding relationship table pre-defined by those skilled in the art based on statistics on a large number of feature information of the wireless local area network and category information of the wireless local area network corresponding to the large number of feature information, and storing the corresponding relationships between the feature information and the category information of a plurality of wireless local area networks.

In some alternative implementations, the classification model may be obtained by training by the following method.

First, acquiring a third training sample set. Here, a third training sample may include the feature information of the wireless local area network and category information of the wireless local area network corresponding to the feature information.

Secondly, using the feature information of the training sample in the third training sample set as an input, using the category information corresponding to the input feature information as a desired output, and training to obtain the classification model. Here, the classification model may include, but is not limited to, a logistic regression model, a decision tree model, a naive Bayesian model, a support vector machine model, or the like. The training process of the classification model is similar to the principle of the category determination sub-model, and repeated description thereof will be omitted.

Figure 3:
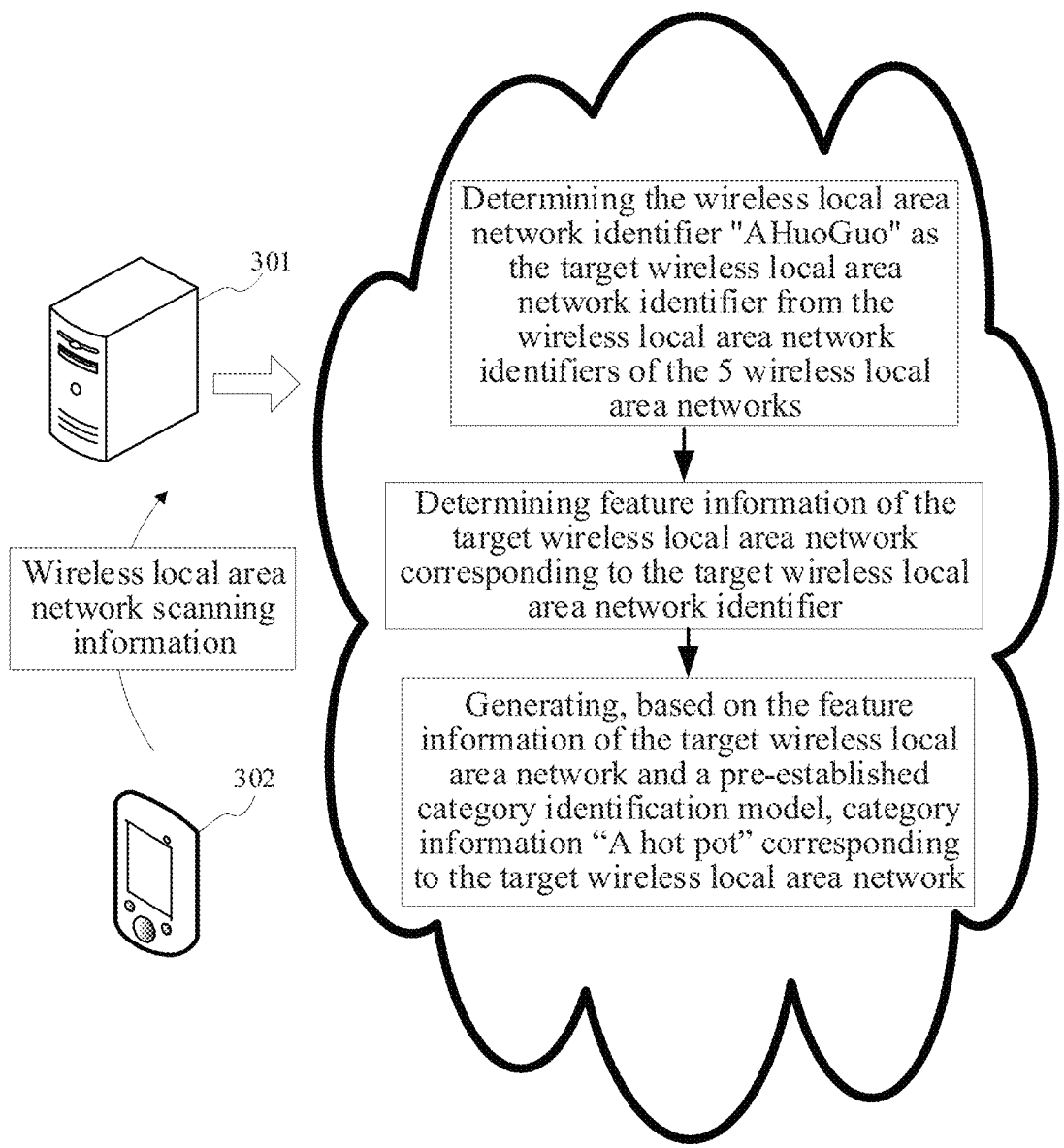
FIG. 3 is a schematic diagram of an application scenario of the method for generating information according to an embodiment of the present disclosure.

With further reference to FIG. 3, FIG. 3 is a schematic diagram of an application scenario of the method for generating information according to an embodiment of the present disclosure. In the application scenario of FIG. 3, a server 301 may first receive wireless local area network scanning information sent by a terminal 302, where the wireless local area network scanning information includes the wireless local area network identifiers of 5 wireless local area networks {A123, 211, AHuoGuo, AAA, BBB}. Then, the server 301 determines the wireless local area network identifier "AHuoGuo" as the target wireless local area network identifier from the wireless local area network identifiers of the 5 wireless local area networks. Then, the server 301 determines feature information of the target wireless local area network corresponding to the target wireless local area network identifier. Finally, based on the feature information of the target wireless local area network and a pre-established category identification model, category information "A hot pot" corresponding to the target wireless local area network is generated. Here, the category identification model may be used to represent the corresponding relationship between the feature information and the category information. In the present application scenario, "A Hot Pot" is the brand name of a chain hot pot restaurant.

The method provided by the above embodiment of the present disclosure effectively utilizes the wireless local area network scanning information sent by the terminal, and quickly generates category information corresponding to the target wireless local area network.

Figure 4:
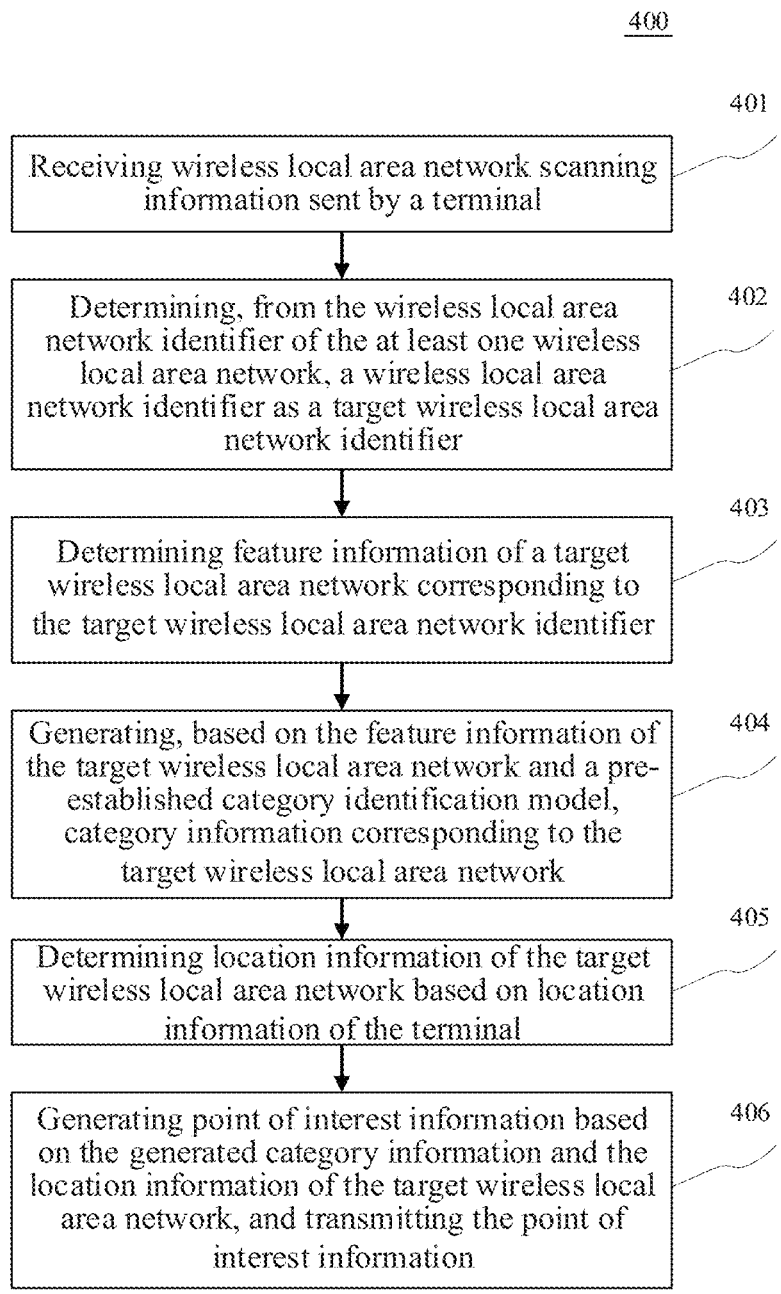
FIG. 4 is a flowchart of the method for generating information according to another embodiment of the present disclosure.

With further reference to FIG. 4, a flow 400 of another embodiment of the method for generating information is illustrated. The flow 400 of the method for generating information includes the following steps.

Step 401, receiving wireless local area network scanning information sent by a terminal.

In the present embodiment, step 401 is similar in principle to step 201 in the embodiment shown in FIG. 2, and repeated description thereof will be omitted.

Step 402, determining, from the wireless local area network identifier of the at least one wireless local area network, a wireless local area network identifier as a target wireless local area network identifier.

In the present embodiment, step 402 is similar in principle to step 202 in the embodiment shown in FIG. 2, and repeated description thereof will be omitted.

Step 403, determining feature information of a target wireless local area network corresponding to the target wireless local area network identifier.

In the present embodiment, step 403 is similar in principle to step 203 in the embodiment shown in FIG. 2, and repeated description thereof will be omitted.

Step 404, generating, based on the feature information of the target wireless local area network and a pre-established category identification model, category information corresponding to the target wireless local area network.

In the present embodiment, step 404 is similar in principle to step 204 in the embodiment shown in FIG. 2, and repeated description thereof will be omitted.

Step 405, determining location information of the target wireless local area network based on location information of the terminal.

In the present embodiment, the executing body may first acquire location information of the terminal by using multiple methods. For example, the executing body may determine the location information of the terminal by using positioning data of the GPS installed in the terminal. For example, the executing body may locate the terminal based on the wireless local area network scanning information sent by the terminal, for example, using the wireless local area network scanning information and an existing wireless local area network location fingerprinting method to locate the terminal, thereby obtaining the location information of the terminal. Then, the executing body may determine the location information of the target wireless local area network based on the location information of the terminal and the signal strength of the target wireless local area network. In actual use, the farther a device is from the transmitting device of the wireless local area network, the weaker the wireless local area network signal that can be scanned. Based on this principle, the executing body may determine the location information of the target wireless local area network based on the location information of the terminal and the signal strength of the target wireless local area network scanned by the terminal.

Step 406, generating point of interest information based on the generated category information and the location information of the target wireless local area network, and transmitting the point of interest information.

In the present embodiment, the executing body may generate point of interest information based on the category information generated in step 404 and the location information of the target wireless local area network determined in step 405, and transmit the generated point of interest information. For example, the generated point of interest information is sent to a specified terminal device, such as a terminal device used by the staff. As another example, the generated point of interest information is sent to a designated data storage server to store the generated point of interest information.

As can be seen from FIG. 4, the flow 400 of the method for generating information in the present embodiment highlights the step of generating point of interest information as compared with the embodiment corresponding to FIG. 2. Therefore, the solution described in the present embodiment effectively utilizes the wireless local area network scanning information sent by the terminal, and realizes automatic generation of the point of interest information. At the same time, once a target wireless local area network is scanned, point of interest information at the corresponding location of the target wireless local area network may be generated, which greatly shortens the discovery period for the point of interest.

Figure 5:
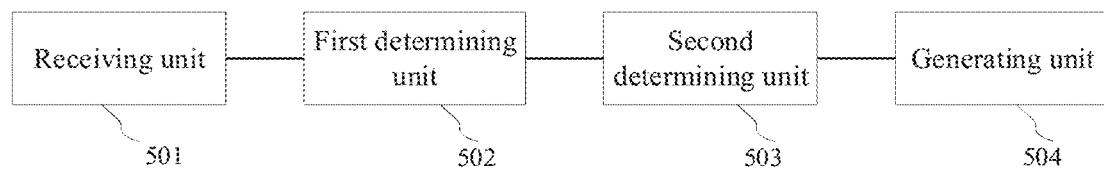
FIG. 5 is a schematic structural diagram of an apparatus for generating information according to an embodiment of the present disclosure.

With further reference to FIG. 5, as an implementation of the method shown in the above figures, the present disclosure provides an embodiment of an apparatus for generating information, and the apparatus embodiment corresponds to the method embodiment as shown in FIG. 2, and the apparatus may be specifically applied to various electronic devices.

As shown in FIG. 5, the apparatus 500 for generating information of the present embodiment includes: a receiving unit 501, a first determining unit 502, a second determining unit 503 and a generating unit 504. The receiving unit 501 is configured to receive wireless local area network scanning information sent by a terminal, the wireless local area network scanning information including a wireless local area network identifier of at least one wireless local area network. The first determining unit 502 is configured to determine, from the wireless local area network identifier of the at least one wireless local area network, a wireless local area network identifier as a target wireless local area network identifier. The second determining unit 503 is configured to determine feature information of a target wireless local area network corresponding to the target wireless local area network identifier. The generating unit 504 is configured to generate, based on the feature information of the target wireless local area network and a pre-established category identification model, category information corresponding to the target wireless local area network, the category identification model being used to represent a corresponding relationship between the feature information and the category information.

In the present embodiment, the specific processing and the technical effects thereof of the receiving unit 501, the first determining unit 502, the second determining unit 503, and the generating unit 504 of the apparatus 500 for generating information may be respectively referred to the related descriptions of step 201, step 202, step 203 and step 204 in the embodiment corresponding to FIG. 2, and repeated description thereof will be omitted.

In some alternative implementations of the present embodiment, the apparatus 500 further includes: a third determining unit (not shown in the figure), configured to determine location information of the target wireless local area network based on location information of the terminal; and a transmitting unit (not shown in the figure), configured to generate point of interest information based on the generated category information and the location information of the target wireless local area network, and transmit the point of interest information.

In some alternative implementations of the present embodiment, the category identification model includes a category identification sub-model and a category determination sub-model; and the generating unit 504 includes: a first input unit (not shown in the figure), configured to input the target wireless local area network identifier into the category identification sub-model to obtain a category identification result, where the category identification sub-model is used to represent a corresponding relationship between the wireless local area network identifier and the category identification result; a matching unit (not shown in the figure), configured to determine, in response to determining that the obtained category identification result matches a category in a preset category set, the category matching the obtained category identification result as a target category, and determine a category determination model pre-established for the target category as the category determination sub-model, where the category determination sub-model is configured to determine whether the target wireless local area network corresponding to the feature information belongs to the target category; a second input unit (not shown in the figure), configured to input the feature information of the target wireless local area network into the category determination sub-model to obtain a determination result of whether the target wireless local area network belongs to the target category, where the determination result includes yes or no; and an information determining unit (not shown in the figure), configured to determine, in response to determining that the determination result is yes, the target category as the category information corresponding to the target wireless local area network.

In some alternative implementations of the present embodiment, the category identification sub-model is a K-nearest neighbors algorithm; and the first input unit is further configured to: acquire a first training sample set, where a first training sample includes a wireless local area network identifier and a category corresponding to the wireless local area network identifier; and obtain, based on the first training sample set and the K-nearest neighbors algorithm, the category identification result of the target wireless local area network identifier.

In some alternative implementations of the present embodiment, the category determination sub-model is a two-category model; and the category determination sub-model of the target category is obtained by training by: acquiring a second training sample set, where a second training sample includes feature information and a determination result of whether the target wireless local area network corresponding to the feature information belongs to the target category; and using the feature information of the training sample in the second training sample set as an input, using the determination result of whether the target wireless local area network corresponding to the input feature information belongs to the target category as a desired output, and training to obtain the category determination sub-model.

In some alternative implementations of the present embodiment, the category identification model is a classification model; and the generating unit 504 is further configured to: input the feature information of the target wireless local area network into the classification model to obtain the category information corresponding to the target wireless local area network, where the classification model is used to represent the corresponding relationship between the feature information and the category information of the wireless local area network.

In some alternative implementations of the present embodiment, the classification model is obtained by training by: acquiring a third training sample set, where a third training sample includes feature information of the wireless local area network and category information of the wireless local area network corresponding to the feature information; and using the feature information of the training sample in the third training sample set as an input, using the category information corresponding to the input feature information as a desired output, and training to obtain the classification model.

Figure 6:
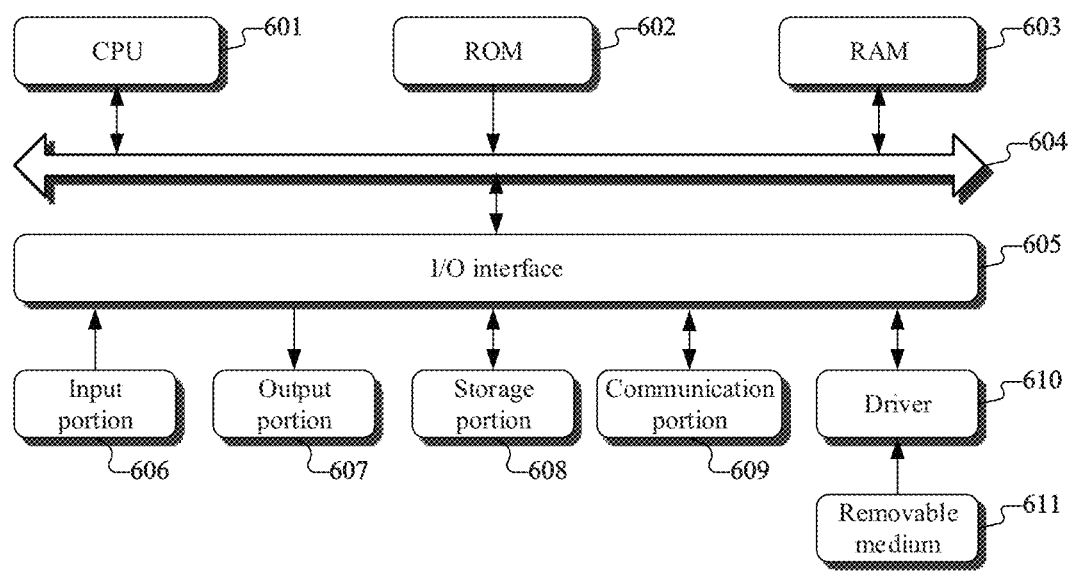
FIG. 6 is a schematic structural diagram of a computer system adapted to implement a server of the embodiments of the present disclosure.

With further reference to FIG. 6, a schematic structural diagram of a computer system 600 adapted to implement a server of an embodiments of the present disclosure is shown. The server shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above-mentioned functionalities as defined by the method of the present disclosure. It should be noted that the computer readable medium in the present disclosure may be computer readable signal medium or computer readable storage medium or any combination of the above two.

An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a receiving unit, a first determining unit, a second determining unit and a generating unit. Here, the names of these units do not in some cases constitute limitations to such units themselves. For example, the receiving unit may also be described as "a unit for receiving wireless local area network scanning information sent by a terminal".

In another aspect, the present disclosure further provides a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: receive wireless local area network scanning information sent by a terminal, the wireless local area network scanning information including a wireless local area network identifier of at least one wireless local area network; determine, from the wireless local area network identifier of the at least one wireless local area network, a wireless local area network identifier as a target wireless local area network identifier; determine feature information of a target wireless local area network corresponding to the target wireless local area network identifier; and generate, based on the feature information of the target wireless local area network and a pre-established category identification model, category information corresponding to the target wireless local area network, the category identification model being used to represent a corresponding relationship between the feature information and the category information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating information, the method comprising:
   receiving wireless local area network scanning information sent by a terminal, the wireless local area network scanning information comprising a wireless local area network identifier of at least one wireless local area network;
   determining, from the wireless local area network identifier of the at least one wireless local area network, a wireless local area network identifier as a target wireless local area network identifier;
   determining feature information of a target wireless local area network corresponding to the target wireless local area network identifier; and
   generating, based on the feature information of the target wireless local area network and a pre-established category identification model, category information corresponding to the target wireless local area network, the category information being a brand of the target wireless local area network, the pre-established category identification model being used to represent a corresponding relationship between the feature information and the category information.

2. The method according to claim 1, wherein the method further comprises:
   determining location information of the target wireless local area network based on location information of the terminal; and
   generating point of interest information based on the generated category information and the location information of the target wireless local area network, and transmitting the point of interest information.

3. The method according to claim 1, wherein the pre-established category identification model comprises a category identification sub-model and a category determination sub-model, and
   wherein the generating, based on the feature information of the target wireless local area network and the pre-established category identification model, the category information corresponding to the target wireless local area network, comprises:
   inputting the target wireless local area network identifier into the category identification sub-model to obtain a category identification result, wherein the category identification sub-model is used to represent a corresponding relationship between the wireless local area network identifier and the category identification result;

determining, in response to determining that the obtained category identification result matches a category in a preset category set, the category matching the obtained category identification result as a target category, and determining a category determination model pre-established for the target category as the category determination sub-model, wherein the category determination sub-model is configured to determine whether the target wireless local area network corresponding to the feature information belongs to the target category;

inputting the feature information of the target wireless local area network into the category determination sub-model to obtain a determination result of whether the target wireless local area network belongs to the target category, wherein the determination result comprises yes or no; and determining, in response to determining that the determination result is yes, the target category as the category information corresponding to the target wireless local area network.

4. The method according to claim 3, wherein the category identification sub-model is a K-nearest neighbors algorithm, and wherein the inputting the target wireless local area network identifier into the category identification sub-model to obtain the category identification result, comprises:

acquiring a first training sample set, wherein a first training sample comprises the wireless local area network identifier and a category corresponding to the wireless local area network identifier; and obtaining, based on the first training sample set and the K-nearest neighbors algorithm, the category identification result of the target wireless local area network identifier.

5. The method according to claim 3, wherein the category determination sub-model is a two-category model, and wherein the category determination sub-model of the target category is obtained by:

acquiring a second training sample set, wherein a second training sample comprises the feature information and the determination result of whether the target wireless local area network corresponding to the feature information belongs to the target category; and using the feature information of the second training sample in the second training sample set as an input, using the determination result of whether the target wireless local area network corresponding to the input feature information belongs to the target category as a desired output, and training to obtain the category determination sub-model.

6. The method according to claim 1, wherein the pre-established category identification model is a classification model, and wherein the generating, based on the feature information of the target wireless local area network and the pre-established category identification model, the category information corresponding to the target wireless local area network, comprises:

inputting the feature information of the target wireless local area network into the classification model to obtain the category information corresponding to the target wireless local area network, wherein the classification model is used to represent the corresponding relationship between the feature information and the category information of the target wireless local area network.

7. The method according to claim 6, wherein the classification model is obtained by:

acquiring a training sample set, wherein the training sample comprises the feature information of the wireless local area network and category information of the wireless local area network corresponding to the feature information; and using the feature information of the training sample in the training sample set as an input, using the category information corresponding to the input feature information as a desired output, and training to obtain the classification model.

8. An apparatus for generating information, the apparatus comprising:

at least one processor; and a memory storing instructions, wherein the instructions when executed by the at least one processor, cause the at least one processor to perform operations, the operations comprising:

receiving wireless local area network scanning information sent by a terminal, the wireless local area network scanning information comprising a wireless local area network identifier of at least one wireless local area network;

determining, from the wireless local area network identifier of the at least one wireless local area network, a wireless local area network identifier as a target wireless local area network identifier;

determining feature information of a target wireless local area network corresponding to the target wireless local area network identifier; and generating, based on the feature information of the target wireless local area network and a pre-established category identification model, category information corresponding to the target wireless local area network, the category information being a brand of the target wireless local area network, the pre-established category identification model being used to represent a corresponding relationship between the feature information and the category information.

9. The apparatus according to claim 8, wherein the operations further comprise:

determining location information of the target wireless local area network based on location information of the terminal; and generating point of interest information based on the generated category information and the location information of the target wireless local area network, and transmit the point of interest information.

10. The apparatus according to claim 8, wherein the pre-established category identification model comprises a category identification sub-model and a category determination sub-model, and wherein the generating, based on the feature information of the target wireless local area network and the pre-established category identification model, category information corresponding to the target wireless local area network, comprises:

inputting the target wireless local area network identifier into the category identification sub-model to obtain a category identification result, wherein the category identification sub-model is used to represent a corresponding relationship between the wireless local area network identifier and the category identification result;

determining, in response to determining that the obtained category identification result matches a category in a preset category set, the category matching the obtained category identification result as a target category, and determining a category determination model pre-established for the target category as the category determination sub-model, wherein the category determination sub-model is configured to determine whether the target wireless local area network corresponding to the feature information belongs to the target category;

inputting the feature information of the target wireless local area network into the category determination sub-model to obtain a determination result of whether the target wireless local area network belongs to the target category, wherein the determination result comprises yes or no; and determining, in response to determining that the determination result is yes, the target category as the category information corresponding to the target wireless local area network.

11. The apparatus according to claim 10, wherein the category identification sub-model is a K-nearest neighbors algorithm; and the inputting the target wireless local area network identifier into the category identification sub-model to obtain the category identification result, comprises:

acquiring a first training sample set, wherein a first training sample comprises the wireless local area network identifier and a category corresponding to the wireless local area network identifier; and obtaining, based on the first training sample set and the K-nearest neighbors algorithm, the category identification result of the target wireless local area network identifier.

12. The apparatus according to claim 10, wherein the category determination sub-model is a two-category model; and the category determination sub-model of the target category is obtained by training by:

acquiring a second training sample set, wherein a second training sample comprises the feature information and the determination result of whether the target wireless local area network corresponding to the feature information belongs to the target category; and using the feature information of the second training sample in the second training sample set as an input, using the determination result of whether the target wireless local area network corresponding to the input feature information belongs to the target category as a desired output, and training to obtain the category determination sub-model.

13. The apparatus according to claim 8, wherein the pre-established category identification model is a classification model; and wherein the generating, based on the feature information of the target wireless local area network and the pre-established category identification model, the category information corresponding to the target wireless local area network, comprises:

inputting the feature information of the target wireless local area network into the classification model to obtain the category information corresponding to the target wireless local area network, wherein the classification model is used to represent the corresponding relationship between the feature information and the category information of the wireless local area network.

14. The apparatus according to claim 13, wherein the classification model is obtained by:

acquiring a training sample set, wherein the training sample comprises the feature information of the wireless local area network and category information of the wireless local area network corresponding to the feature information; and using the feature information of the training sample in the training sample set as an input, using the category information corresponding to the input feature information as a desired output, and training to obtain the classification model.

15. A non-transitory computer readable medium, storing a computer program thereon, the computer program, when executed by at least one processor, causes the at least one processor to perform operations, the operations comprising:

receiving wireless local area network scanning information sent by a terminal, the wireless local area network scanning information comprising a wireless local area network identifier of at least one wireless local area network;

determining, from the wireless local area network identifier of the at least one wireless local area network, a wireless local area network identifier as a target wireless local area network identifier;

determining feature information of a target wireless local area network corresponding to the target wireless local area network identifier; and generating, based on the feature information of the target wireless local area network and a pre-established category identification model, category information corresponding to the target wireless local area network, the category information being a brand of the target wireless local area network, the pre-established category identification model being used to represent a corresponding relationship between the feature information and the category information.

16. The non-transitory computer readable medium according to claim 15, wherein the operations further comprise:

determining location information of the target wireless local area network based on location information of the terminal; and generating point of interest information based on the generated category information and the location information of the target wireless local area network, and transmitting the point of interest information.

17. The non-transitory computer readable medium according to claim 15, wherein the pre-established category identification model comprises a category identification sub-model and a category determination sub-model, and wherein the generating, based on the feature information of the target wireless local area network and the pre-established category identification model, the category information corresponding to the target wireless local area network, comprises:

inputting the target wireless local area network identifier into the category identification sub-model to obtain a category identification result, wherein the category identification sub-model is used to represent a corresponding relationship between the wireless local area network identifier and the category identification result;

determining, in response to determining that the obtained category identification result matches a category in a preset category set, the category matching the obtained category identification result as a target category, and determining a category determination model pre-established for the target category as the category determination sub-model, wherein the category determination sub-model is configured to determine whether the target wireless local area network corresponding to the feature information belongs to the target category;

inputting the feature information of the target wireless local area network into the category determination sub-model to obtain a determination result of whether the target wireless local area network belongs to the target category, wherein the determination result comprises yes or no; and determining, in response to determining that the determination result is yes, the target category as the category information corresponding to the target wireless local area network.

18. The non-transitory computer readable medium according to claim 17, wherein the category identification sub-model is a K-nearest neighbors algorithm; and the inputting the target wireless local area network identifier into the category identification sub-model to obtain the category identification result, comprises:

acquiring a first training sample set, wherein a first training sample comprises the wireless local area network identifier and a category corresponding to the wireless local area network identifier; and obtaining, based on the first training sample set and the K-nearest neighbors algorithm, the category identification result of the target wireless local area network identifier.

19. The non-transitory computer readable medium according to claim 17, wherein the category determination sub-model is a two-category model; and the category determination sub-model of the target category is obtained by training by:

acquiring a second training sample set, wherein a second training sample comprises the feature information and the determination result of whether the target wireless local area network corresponding to the feature information belongs to the target category; and using the feature information of the second training sample in the second training sample set as an input, using the determination result of whether the target wireless local area network corresponding to the input feature information belongs to the target category as a desired output, and training to obtain the category determination sub-model.

20. The non-transitory computer readable medium according to claim 15, wherein the pre-established category identification model is a classification model, and wherein the generating, based on the feature information of the target wireless local area network and the pre-established category identification model, the category information corresponding to the target wireless local area network, comprises:

inputting the feature information of the target wireless local area network into the classification model to obtain the category information corresponding to the target wireless local area network, wherein the classification model is used to represent the corresponding relationship between the feature information and the category information of the wireless local area network.

* * * * *